US012424095B2

(12) United States Patent
Sugano

(10) Patent No.: US 12,424,095 B2
(45) Date of Patent: Sep. 23, 2025

(54) PARKING ASSISTANCE METHOD, PARKING ASSISTANCE APPARATUS, AND NON-TRANSITORY COMPUTER READABLE RECORDING MEDIUM

(71) Applicant: TOYOTA JIDOSHA KABUSHIKI KAISHA, Toyota (JP)

(72) Inventor: Tatsuya Sugano, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 18/201,335

(22) Filed: May 24, 2023

(65) Prior Publication Data

US 2023/0410652 A1 Dec. 21, 2023

(30) Foreign Application Priority Data

Jun. 20, 2022 (JP) ................................ 2022-098852

(51) Int. Cl.
*G08G 1/14* (2006.01)

(52) U.S. Cl.
CPC ............ *G08G 1/145* (2013.01); *G08G 1/143* (2013.01); *G08G 1/144* (2013.01)

(58) Field of Classification Search
None
See application file for complete search history.

(56) References Cited

U.S. PATENT DOCUMENTS

| | | | | |
|---|---|---|---|---|
| 2018/0050690 | A1* | 2/2018 | Kurt .................. | G01C 21/3685 |
| 2019/0193725 | A1 | 6/2019 | Suzuki et al. | |
| 2021/0016792 | A1* | 1/2021 | Kaneko ................ | B60W 10/20 |
| 2021/0122361 | A1* | 4/2021 | Sugano ................ | G05D 1/0223 |
| 2022/0144250 | A1* | 5/2022 | Hidaka ............ | B60W 50/0225 |

FOREIGN PATENT DOCUMENTS

| | | | | |
|---|---|---|---|---|
| JP | 2018-012450 A | 1/2018 | | |
| KR | 20190097510 A * | 8/2019 | ............ | G08G 1/146 |
| WO | 2018/047222 A1 | 3/2018 | | |

* cited by examiner

*Primary Examiner* — Amelia Vorce
(74) *Attorney, Agent, or Firm* — Dinsmore & Shohl LLP

(57) ABSTRACT

A method for assisting parking of a vehicle in a parking lot is proposed. The method comprises the steps of generating node information from a start position to an end position of a leaving operation of the vehicle, calculating a reference distance between a start node and a reference node which is a node located in front of the vehicle among nodes located on a drive aisle of the parking lot, calculating, for respective target nodes, an aisle distance which is a distance from the reference node, the target nodes being nodes from the reference node to an end node, identifying a specific node which is a node whose the aisle distance is most approximate to the reference distance among the target nodes, and transmitting, to the vehicle, the node information regarding the start node and regarding the target nodes from the specific node to the end node.

5 Claims, 8 Drawing Sheets

10: AVP SYSTEM

PARKING ASSISTANCE METHOD, PARKING ASSISTANCE APPARATUS, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2022-098852, filed Jun. 20, 2022, the contents of which application are incorporated herein by reference in their entirety.

BACKGROUND

Technical Field

The present disclosure relates to a technique for assisting parking of a vehicle in a parking lot.

Background Art

Patent Literature 1 discloses a dispatch support method including determining whether a parked vehicle is present adjacent to a parking space that is adjacent to a dispatch start position, and generating a dispatch route including the adjacent parking space if there is no adjacent parked vehicle.

In addition, there is the following Patent Literature 2 as a document showing the technical level of this technical field.

LIST OF RELATED ART

Patent Literature 1: WO 2018/047222 A1
Patent Literature 2: JP 2018/012450 A

SUMMARY

Automated valet parking (AVP) is an example of a technique for assisting parking of a vehicle in a parking lot. In particular, as a technique for realizing the AVP, it is considered that a control center managing the parking lot transmits node information to the vehicle. The node information is information regarding a plurality of nodes that provides positions in the parking lot to determine a travel route. In this case, a computer of the vehicle executes a process of generating a travel trajectory based on the node information received from the control center, and a process of controlling the vehicle to travel along the generated travel trajectory.

Conventionally, in the node information transmitted from the control center, the travel route determined by the plurality of nodes is represented by discrete values in a coordinate system defined in the parking lot. For this reason, there may be nodes which are not actually considered in the process of generating the travel trajectory executed by the computer of the vehicle. This causes an increase in the processing load on the computer of the vehicle. And an increase in the processing load may lead to an increase in cost. In particular, the inventor according to the present disclosure has found that nodes which are not considered frequently exist in the travel trajectory generated when the vehicle performs an leaving operation from the parking lot.

In view of the above problem, an object of the present disclosure is to provide a technique for assisting parking of a vehicle in a parking lot by transmitting node information to the vehicle, the technique being capable of reducing the processing load of a process of generating a travel trajectory when the vehicle performs a leaving operation.

A first disclosure is directed to a method for assisting parking of a vehicle in a parking lot.

The method according to the first disclosure comprises the steps of:

- generating node information from a start position to an end position of a leaving operation of the vehicle when a leaving of the vehicle from the parking lot is started;
- calculating a reference distance which is a distance between a start node being a node corresponding to the start position and a reference node being a node located in front of the vehicle among nodes located on a drive aisle of the parking lot;
- calculating, for respective target nodes, an aisle distance which is a distance from the reference node, the target nodes being nodes from the reference node to an end node being a node corresponding to the end position;
- identifying a specific node which is a node whose the aisle distance is most approximate to the reference distance among the target nodes; and
- transmitting, to the vehicle, the node information regarding the start node and regarding the target nodes from the specific node to the end node.

A second disclosure is directed to a method including the following features with respect to the method according to the first disclosure.

The step of calculating the aisle distance includes the steps of:

- calculating the aisle distance sequentially for the target nodes in an order closer to the reference node; and
- terminating the calculating the aisle distance when the calculated aisle distance is greater than or equal to the reference distance.

A third disclosure is directed to a method including the following features with respect to the method according to the second disclosure.

The step of identifying the specific node includes the step of selecting, as the specific node, one of a first node and a second node whose the aisle distance is closer to the reference distance, the first node being a node to be a calculated target when the aisle distance is calculated greater than or equal to the reference distance, the second node being a node to be the calculated target just before the calculation for the first node.

A fourth disclosure is directed to an apparatus for assisting parking of a vehicle in a parking lot.

The apparatus according to the fourth disclosure is configured to execute:

- generating node information from a start position to an end position of a leaving operation of the vehicle when a leaving of the vehicle is started;
- calculating a reference distance which is a distance between a start node being a node corresponding to the start position and a reference node being a node located in front of the vehicle among nodes located on a drive aisle of the parking lot;
- calculating, for respective target nodes, an aisle distance which is a distance from the reference node, the target nodes being nodes from the reference node to an end node being a node corresponding to the end position;
- identifying a specific node which is a node whose the aisle distance is most approximate to the reference distance among the target nodes; and
- transmitting, to the vehicle, the node information regarding the start node and regarding the target nodes from the specific node to the end node.

A fifth disclosure is directed to a computer program for assisting parking of a vehicle in a parking lot.

The computer program according to the fourth disclosure, when executed by a computer, cause the computer to execute:

- generating node information from a start position to an end position of a leaving operation of the vehicle when a leaving of the vehicle is started;
- calculating a reference distance which is a distance between a start node being a node corresponding to the start position and a reference node being a node located in front of the vehicle among nodes located on a drive aisle of the parking lot;
- calculating, for respective target nodes, an aisle distance which is a distance from the reference node, the target nodes being nodes from the reference node to an end node being a node corresponding to the end position;
- identifying a specific node which is a node whose the aisle distance is most approximate to the reference distance among the target nodes; and
- transmitting, to the vehicle, the node information regarding the start node and regarding the target nodes from the specific node to the end node.

According to the present disclosure, with respect to the node information from the start position to the end position of the leaving operation of the vehicle, the specific node whose the aisle distance is most approximate to the reference distance is identified. And, among the node information, the node information regarding the start node and regarding nodes from the specific node to the end node is transmitted to the vehicle. It is thus possible to, when the vehicle performs the leaving operation, reduce the possibility that the transmitted node information includes nodes which are not considered in the process of generating the travel trajectory. Consequently, it is possible to reduce the processing load of the process of generating the travel trajectory. Furthermore, it is possible to reduce the cost of the computer of the vehicle.

EMBODIMENTS

1. Outline

A parking assistance apparatus according to the present embodiment assists parking of a vehicle in a parking lot. In particular, the parking assistance apparatus according to the present embodiment constitutes an AVP system.

Figure 1:
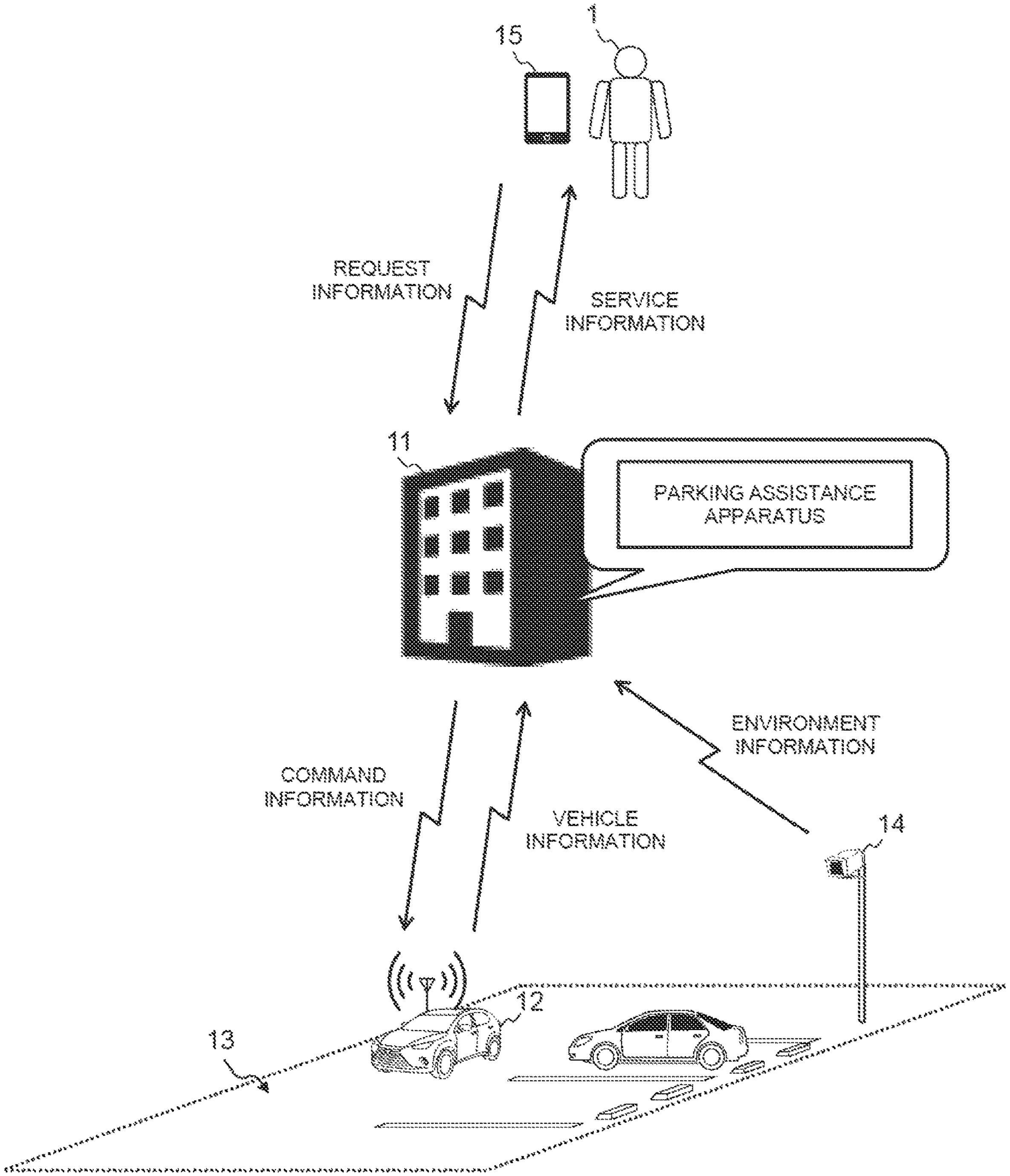
FIG. 1 is a conceptual diagram for explaining an outline of an AVP system 10 constituted by a parking assistance apparatus according to the present embodiment.

FIG. 1 is a conceptual diagram for explaining an outline of an AVP system 10 constituted by the parking assistance apparatus according to the present embodiment. The AVP system 10 causes a target vehicle 12 to travel in a parking lot 13 in response to a request of a user 1. The traveling of the vehicle 12 is managed by a control center 11. The vehicle 12 performs autonomous driving based on command information acquired from the control center 11. Examples of the command information include a parking space, a start of parking, a start of leaving, a parking time, a travel route, and the like. The autonomous driving of the vehicle 12 is typically performed by a computer of the vehicle 12, in particular, an electronic control unit (ECU) provided in the vehicle 12.

The control center 11 acquires request information showing a request of the user 1 from a user device 15. The user device 15 receives an input of the request by an operation of the user 1 and transmits the request information to the control center 11. The user device 15 is, for example, a portable computer device in which a predetermined application is installed (typically, a smartphone). Alternatively, the user device 15 may be a dedicated device for the AVP service located at a predetermined location. Examples of the request information transmitted by the user device 15 include a parking request, a leaving request, and a scheduled leaving time.

The control center 11 further acquires vehicle information of the vehicle 12 and environment information of the parking lot 13. Examples of the vehicle information include vehicle specifications, a traveling state, and the like of the vehicle 12. Examples of the environmental information include availability of a parking space, situations of pedestrians and obstacles in the parking lot 13, and traveling situations of other vehicles. The control center 11, for example, acquires the vehicle information by communicating with the vehicle 12. The environment information is, for example, detected by a sensor 14 (e.g., a camera, a vehicle detection sensor, or the like) provided in the parking lot 13, and the control center 11 acquires the environment information by communicating with the sensor 14.

The control center 11 transmits command information so as to satisfy the request of the user 1 based on the vehicle information and the environment information. The control center 11 may transmit information regarding the AVP service (service information) to the user device 15 at any time. Examples of the service information include a usage status of the parking lot 13, a parking time of the vehicle 12, and the like.

The parking assistance apparatus according to the present embodiment constitutes such the AVP system 10. In the AVP system 10 shown in FIG. 1, the parking assistance apparatus according to the present embodiment realizes the function of the control center 11. That is, the control center 11 includes the parking assistance apparatus, and the command information is generated by a process executed by the parking assistance apparatus.

In particular, the parking assistance apparatus according to the present embodiment generates node information as the command information regarding the travel route. The node information is information regarding a plurality of nodes that provides positions in the parking lot 13 and determine the travel route. When the control center 11 transmits the node information, the ECU of the vehicle 12 executes a process of generating a travel trajectory based on the node information and a process of controlling the vehicle 12 to travel along the generated travel trajectory. In this way, the autonomous driving of the vehicle 12 is performed. Hereinafter, the node information and the travel trajectory generated based on the node information will be described with reference to FIGS. 2 and 3.

Figure 2:
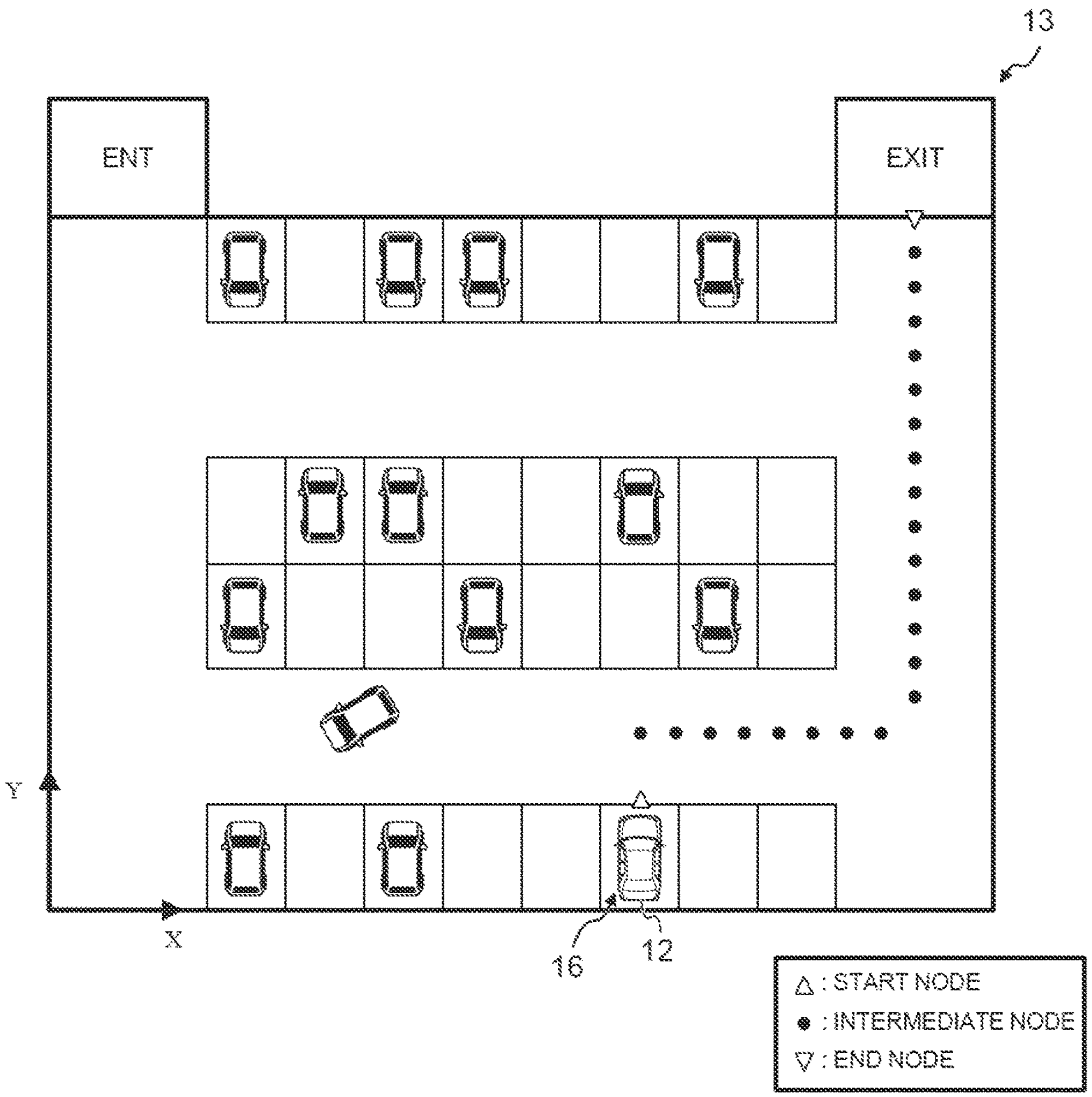
FIG. 2 is a conceptual diagram for explaining node information generated by the parking assistance apparatus according to the present embodiment.

First, the node information generated by the parking assistance apparatus according to the present embodiment will be described with reference to FIG. 2. FIG. 2 shows a case in which the vehicle 12 parked in the parking space 16 is leaving from the parking lot 13 by causing the vehicle 12 to travel to the exit of the parking lot 13. And FIG. 2 conceptually shows an example of a plurality of nodes given by the node information. As shown in FIG. 2, when the vehicle 12 is leaving, the parking assistance apparatus generates, as node information, a plurality of nodes that determines a leaving route from a start position (the parking space 16 in FIG. 2) to an end position (the exit in FIG. 2) of the leaving operation of the vehicle 12. Hereinafter, a node corresponding to the start position is referred to as a "start node", a node corresponding to the end position is referred to as an "end node", and each node between the start node and the end node is referred to as an "intermediate node".

The parking assistance apparatus generates the start node so as to be located in front of the vehicle 12. For example, the parking assistance apparatus generates the start node to be located at the center of the front line of the parking space 16. And the parking assistance apparatus generates intermediate nodes up to the end node so as to be located on a drive aisle of the parking lot 13. Typically, the parking assistance apparatus generates intermediate nodes up to the end node to be located at the center of the drive aisle of the parking lot 13.

Each of the positions in the parking lot 13 determined by each of the plurality of nodes is represented by coordinates on a coordinate system defined in the parking lot 13. Therefore, a travel route determined by the plurality of nodes is represented by discrete values in the coordinate system defined in the parking lot 13. In the example shown in FIG. 2, a two-dimensional Cartesian coordinate system is defined in the parking lot 13 by an X axis and a Y axis. In this case, each position in the parking lot 13 given by each of the plurality of nodes is represented by two-dimensional coordinate values (X, Y). The travel path determined by the plurality of nodes is represented by a set of two-dimensional coordinate values (X, Y).

The node information may include information regarding the sequence number of the plurality of nodes for giving an order how the leaving route is determined. This makes it possible to determine the next node for one of the plurality of nodes. The parking assistance apparatus may be configured to generate additional information regarding the plurality of nodes as the node information. Examples of the additional information include a passing direction of each node, a type of each node (e.g., whether each node is the start node, the intermediate node, or the end node), a gradient to the next node, a curvature or a radius of curvature to the next node, a width to the next node, and an upper limit vehicle speed to the next node.

Figure 3:
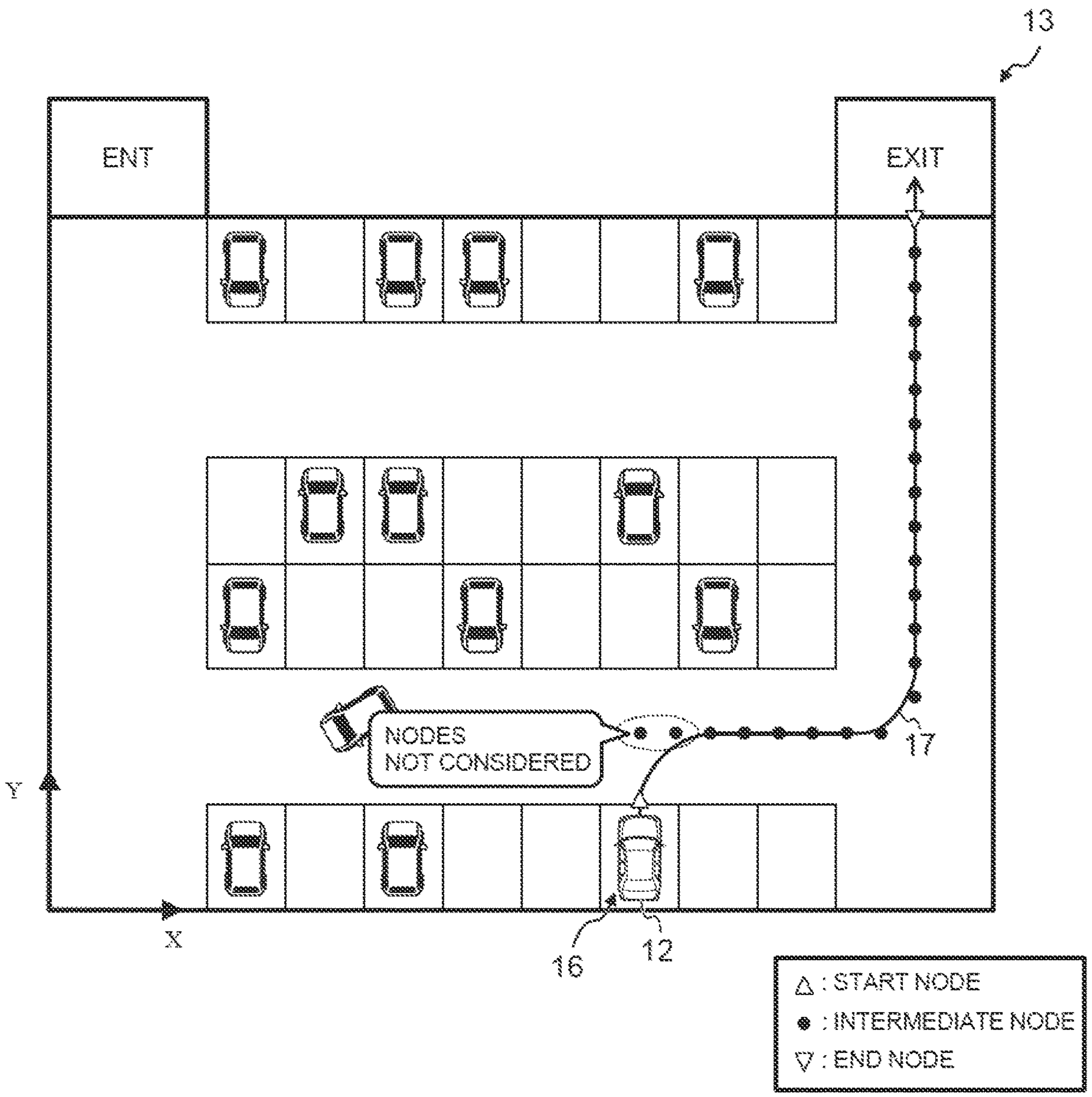
FIG. 3 is a conceptual diagram for explaining a travel trajectory generated based on the node information.

Next, a travel trajectory generated based on the node information will be described with reference to FIG. 3. FIG. 3 shows, as an example, a travel trajectory 17 generated based on the node information shown in FIG. 2. The travel trajectory 17 is generated so as to pass through each of the plurality of nodes. The vehicle 12 is controlled to travel along the generated travel trajectory 17.

As shown in FIG. 3, there may be nodes which are not actually considered in the generation of the travel trajectory 17. The nodes which are not actually considered are considered to be unnecessary information as the node information for generating the travel trajectory 17. It is not desirable in data communication that unnecessary information is included in the node information transmitted from the control center 11. Furthermore, in the process of generating the travel trajectory 17, since the process is executed including the unnecessary information, it is necessary to generate the travel trajectory 17 so as to exclude the unnecessary information. This causes an increase in processing load. The increase in the processing load may cause an increase in the cost of the ECU of the vehicle 12.

In particular, the inventor according to the present disclosure has found that, in a travel trajectory generated when the vehicle 12 performs a leaving operation, nodes which are not actually considered frequently exist on the travel trajectory from the start position to a position the vehicle 12 starts traveling the drive aisle of the parking lot 13. This is because it is effective, in terms of ease of processing, for the parking assistance apparatus to generate the intermediate nodes from a position in front of the vehicle 13 for determining the leaving route on the drive aisle of the parking lot 13, whereas in the leaving operation it is rational for the vehicle 12 to generate a travel trajectory such that the vehicle 12 reaches the aisle of the parking lot 13 while turning from the start position. On the other hand, it is not desirable that the parking assistance apparatus predicts a travel trajectory of the vehicle 12 and generate the node information based on the prediction. This is because the processing load of the parking assistance apparatus may be excessively increased.

Figure 4A:
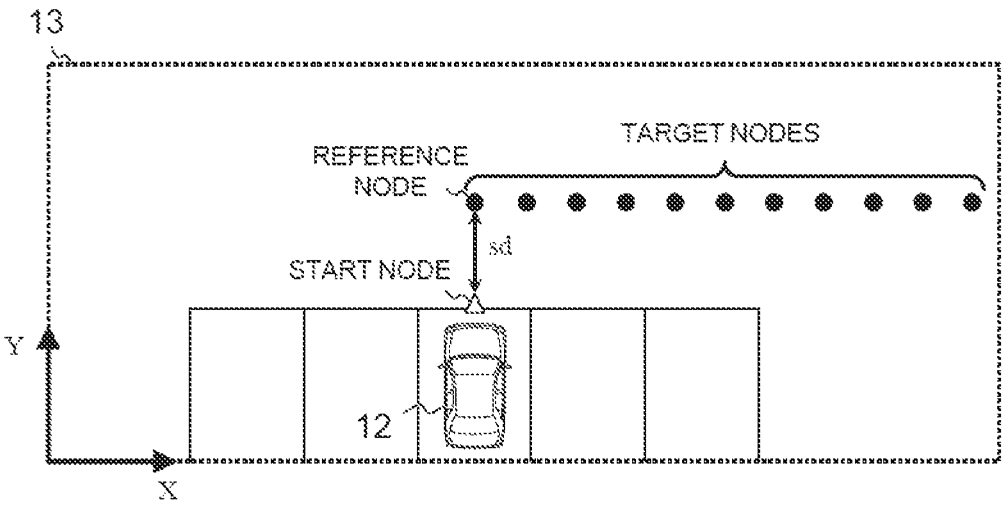
FIG. 4A is a conceptual diagram for explaining functions realized by processes executed by the parking assistance apparatus according to the present embodiment.
Figure 4B:
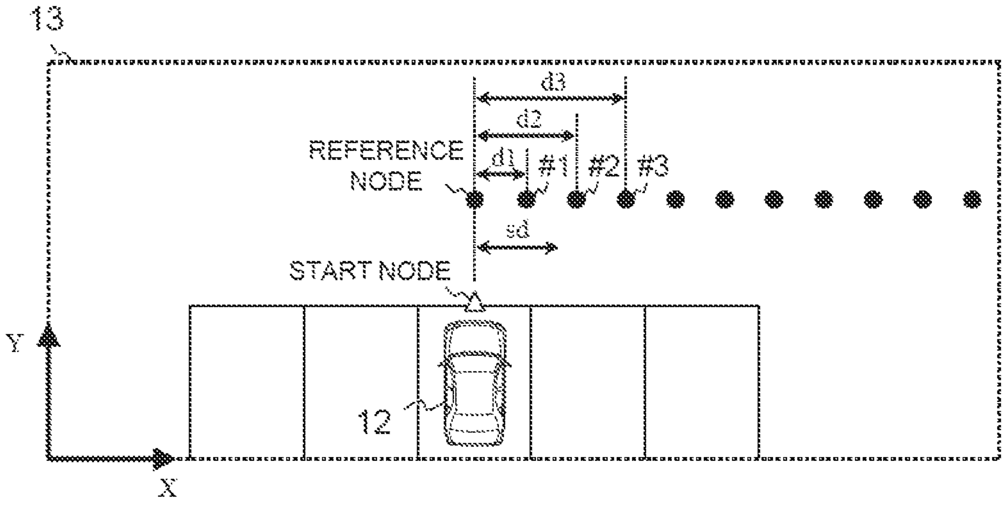
FIG. 4B is a conceptual diagram for explaining functions realized by processes executed by the parking assistance apparatus according to the present embodiment.
Figure 4C:
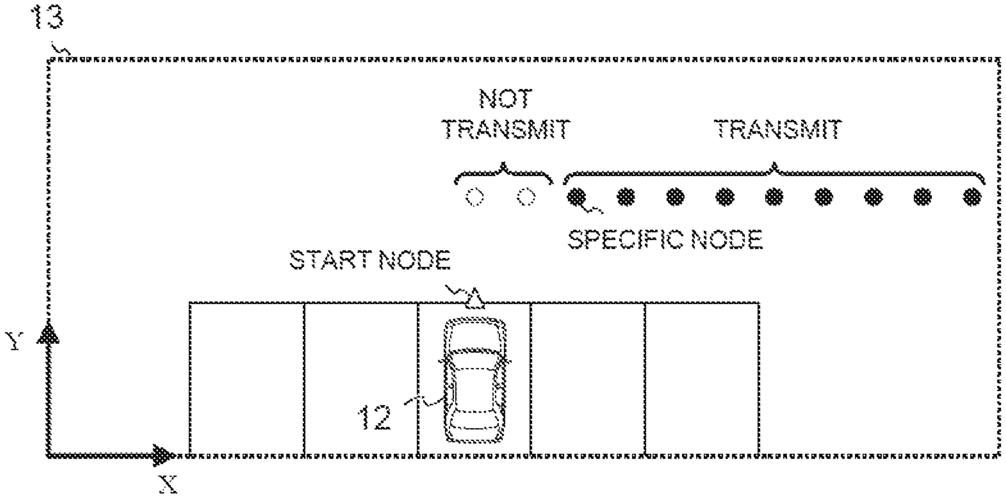
FIG. 4C is a conceptual diagram for explaining functions realized by processes executed by the parking assistance apparatus according to the present embodiment.

In order to address the above problem, the parking assistance apparatus according to the present embodiment, when the vehicle 12 performs the leaving operation, executes processes for reducing that the node information to be transmitted includes nodes which are actually not considered in the process of generating the travel trajectory 17. Functions realized by the processes executed by the parking assistance apparatus according to the present embodiment will be described with reference to FIGS. 4A, 4B and 4C. FIGS. 4A, 4B and 4C each show a conceptual diagram similar to FIG. 2 in the vicinity of the start position of the leaving operation of the vehicle 12. In the following description, it is assumed that the parking assistance apparatus has already generated the node information from the start position to the end position of the leaving operation of the vehicle 12. The method of generating the node information may employ a conventional technique.

First, as shown in FIG. 4A, the parking assistance apparatus according to the present embodiment calculates a reference distance sd which is a distance between the start node and a reference node. The reference node is a node located in front of the vehicle 12 among nodes located on the drive aisle of the parking lot 13. Typically, the reference node is a starting point of the intermediate nodes determining the leaving route leading to the end node on the drive aisle of the parking lot 13.

Next, as shown in FIG. 4B, the parking assistance apparatus according to the present embodiment calculates, for respective target nodes, an aisle distance which is a distance from the reference node, the target nodes being nodes from the reference node to the end node. In FIG. 4B, for target nodes of #1, #2, and #3, calculated aisle distances d1, d2, and d3 are shown respectively. The aisle distance is similarly calculated for other target nodes. However, the number of nodes for which the aisle distance is calculated among the target nodes need only be sufficient to identify a specific node described later.

Next, the parking assistance apparatus according to the present embodiment identifies a specific node whose the aisle distance is most approximate to the reference distance among the target nodes. In the example shown in FIG. 4B, since the aisle distance d2 of the node indicated by #2 is most approximate to the reference distance sd, the node indicated by #2 is identified as the specific node.

Then, as shown in FIG. 4C, the parking assistance apparatus according to the present embodiment executes a process of transmitting, to the vehicle 12, the node information regarding the start node and regarding the target nodes from the specific node to the end node. On the other hand, the parking assistance apparatus does not transmit the node information regarding the target nodes from the reference node to before the specific node to the vehicle 12. For example, in the example shown in FIGS. 4B and 4C, the node information regarding the reference nod and the node indicated by #1 is not transmitted to the vehicle 12. This can also be rephrased that the parking assistance apparatus removes the nodes from the reference node to before the specific node from the generated node information.

The parking assistance apparatus normally generates the intermediate nodes determining the leaving route on the drive aisle of the parking lot 13 so as to be located at the center of the drive aisle. On the other hand, it is considered that the travel trajectory 17 is generated so as to reach the center of the drive aisle with a constant curvature from the start node. That is, it is considered that the reference distance sd approximates the turning radius of the vehicle 12 from the start position to the aisle of the parking lot 13. From this point, it is considered that there is a high possibility that the nodes before reaching the specific node are nodes which are actually not considered in the process of generating the travel trajectory 17.

According to the parking assistance apparatus of the present embodiment, the node information transmitted to the vehicle 12 is the node information regarding the start node and regarding the target nodes from the specific node to the end node. Then, it is possible to reduce the possibility that the node information to be transmitted includes nodes which are actually not considered in the process of generating the travel trajectory 17. Furthermore, the amount of data to be transmitted to the vehicle 12 can be reduced. This is particularly effective when the node information includes a large amount of the additional information. In addition, in the processes executed by the parking assistance apparatus according to the present embodiment, the processes for identifying the specific node is normally completed in several steps. Therefore, in the parking assistance apparatus according to the present embodiment, the processing load does not excessively increase as compared with the related art.

2. Configuration

The following will describe the AVP system 10 constituted by the parking assistance apparatus according to the present embodiment and a configuration of the parking assistance apparatus according to the present embodiment.

2-1. AVP System

Figure 5:
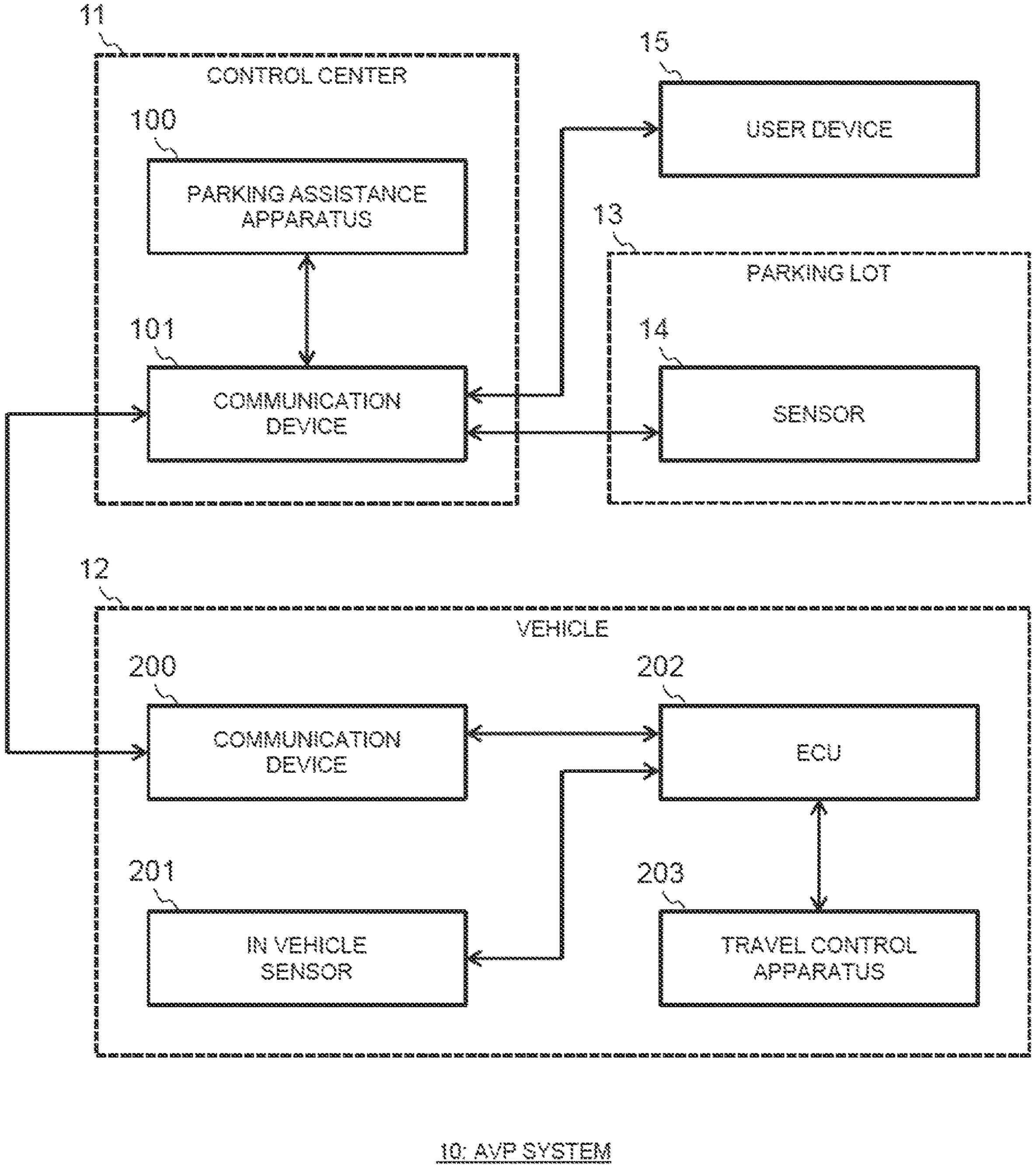
FIG. 5 is a block diagram showing a configuration of the AVP system constituted by the parking assistance apparatus according to the present embodiment.

First, a configuration of the AVP system 10 will be described with reference to Figure FIG. 5 is a block diagram showing an example of the configuration of the AVP system 10.

The control center 11 includes the parking assistance apparatus 100 and a communication device 101.

The parking assistance apparatus 100 executes a process of generating the command information based on information acquired through the communication device 101. In particular, the parking assistance apparatus according to the present embodiment generates the node information as the command information regarding the travel route. And the parking assistance apparatus 100 executes a process of transmitting the command information to the vehicle 12 through the communication device 101. The parking assistance apparatus 100 may be configured to execute processes related to other AVP services. For example, the parking assistance apparatus 100 may be configured to execute a process of transmitting the service information to the user device 15 through the communication device 101 at any time.

The communication device 101 communicates with a device outside the control center 11 to transmit/receive information. In particular, the communication device 101 is configured to be able to communicate with a communication device 200 of the vehicle 12, a sensor 14 provided in the parking lot 13, and the user device 15. That is, the control center 11, the vehicle 12, the user device 15, and the sensor 14 constitute a communication network. For example, the communication device 200 of the vehicle 12, the sensor 14, and the user device 15 are configured to perform wireless communication with a base station constituting the Internet, and the communication device 101 is configured to connect to the Internet. Information received by the communication device 101 is transmitted to the parking assistance apparatus 100. Examples of the information received by the communication device 101 include the request information, the vehicle information of the vehicle 12, and the environment information of the parking lot 13.

The vehicle 12 includes the communication device 200, an in-vehicle sensor 201, an ECU 202, and a travel control apparatus 203.

The communication device 200 communicates with a device outside the vehicle 12 to transmit/receive information. As described above, the communication device 200 is configured to be able to communicate with the communication device 101 of the control center 11. The communication device 200 may be configured to be able to communicate with other external devices such as a specific server configured on the Internet. The communication device 200 is, for example, a device that performs wireless communication with a base station. Information received by the communication device 200 is transmitted to the ECU 202. The communication device 200 receives at least the command information. Other examples of the information received by the communication device 200 include map information, road traffic information, and the like.

The in-vehicle sensor 201 detects information related to the driving environment of the vehicle 12 and outputs the detected information. The in-vehicle sensor 201 typically includes a sensor that detects information of a surrounding environment of the vehicle 12 (a preceding vehicle, a white line, an obstacle, or the like) and a sensor that detects information of a traveling state of the vehicle 12 (a vehicle speed, an acceleration, a yaw rate, or the like). Examples of the sensor that detects information of the surrounding environment of the vehicle 12 include a camera, a millimeter wave radar, and a LiDAR. Examples of the sensor that detects information of the traveling state of the vehicle 12 include a wheel speed sensor, a G sensor, and a gyro sensor. The detected information output by the in-vehicle sensor 201 is transmitted to the ECU 202.

The ECU 202 executes processes regarding the AVP service based on the acquired information and outputs a control signal. In particular, the ECU 202 is configured to execute a process of generating the travel trajectory 17 based on the command information transmitted from the control center 11, and a process of generating the control signal so that the vehicle 12 travel along the generated travel trajectory 17. The control signal output from the ECU 202 is transmitted to the travel control apparatus 203. The ECU 202 may be configured by a plurality of ECUs. In this case, the ECU 202 indicates a system configured by the plurality of ECUs.

The travel control apparatus 203 executes a process regarding travel control of the vehicle 12. The travel control apparatus 203 performs the travel control in accordance with the control signal acquired from the ECU 202, thereby realizing traveling of the vehicle 12 as the AVP. The travel control apparatus 203 includes, for example, a group of actuators provided in the vehicle 12 and one or more ECUs controlling the operation of the group of actuators. Examples of the group of actuators provided in the vehicle 12 include an actuator that drives a power unit (an internal combustion engine, an electric motor, or the like), an actuator that drives a brake mechanism, an actuator that drives a steering mechanism, and the like.

2-2. Parking Assistance Apparatus

Figure 6:
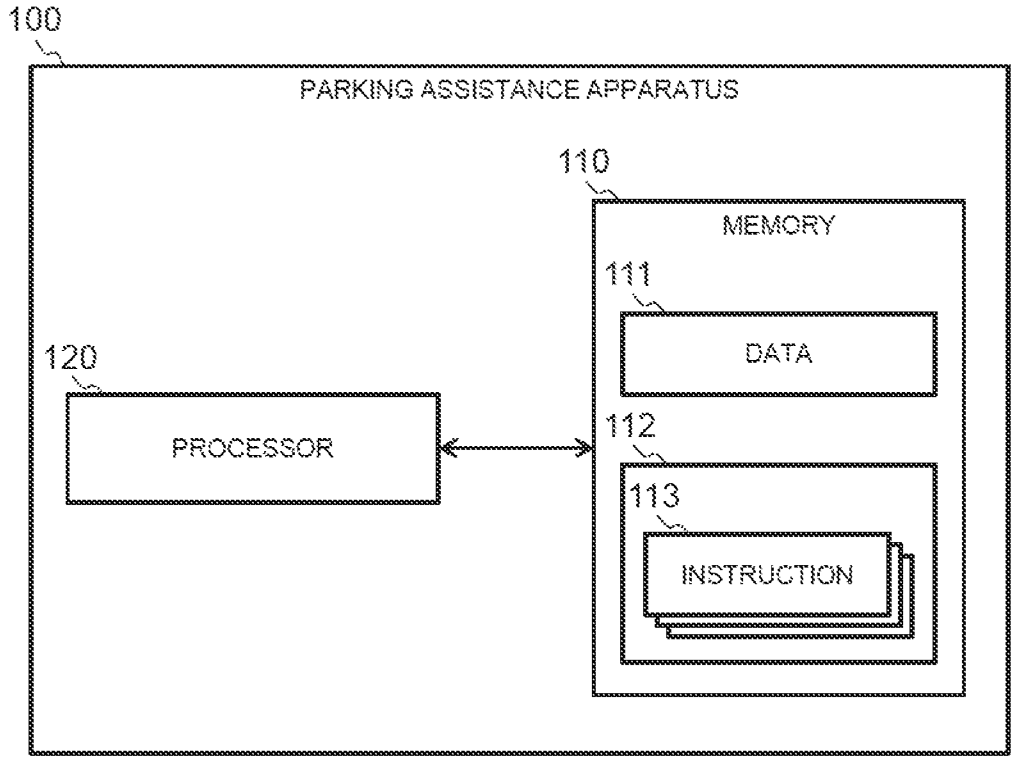
FIG. 6 is a block diagram showing a configuration of the parking assistance apparatus according to the present embodiment.

Next, a configuration of the parking assistance apparatus 100 according to the present embodiment will be described with reference to FIG. 6. FIG. 6 is a block diagram showing an example of the configuration of the parking assistance apparatus 100.

The parking assistance apparatus 100 is a computer including a memory 110 and a processor 120. The memory 110 is coupled to the processor 120 and stores data 111 required for performing processes and executable instructions 113. The instructions 113 are provided by a computer program 112. The computer program 112 may be recorded on a non-transitory computer readable medium included in the memory 110. In this sense, the memory 110 may also be referred to as a "program memory". Information acquired from the communication device 101 is stored in the memory 110 as the data 111.

The instructions 113 are configured to cause the processor 120 to execute prescribed processes. That is, the processor 120 operates in accordance with the instructions 113, thereby realizing execution of the prescribed processes. In particular, the instructions 113 are configured to cause the processor 120 to execute a process of generating the node information and a process of transmitting the node information to the vehicle 12 through the communication device 101. The processes executed in the parking assistance apparatus 100 will be described later.

3. Process

Figure 7:
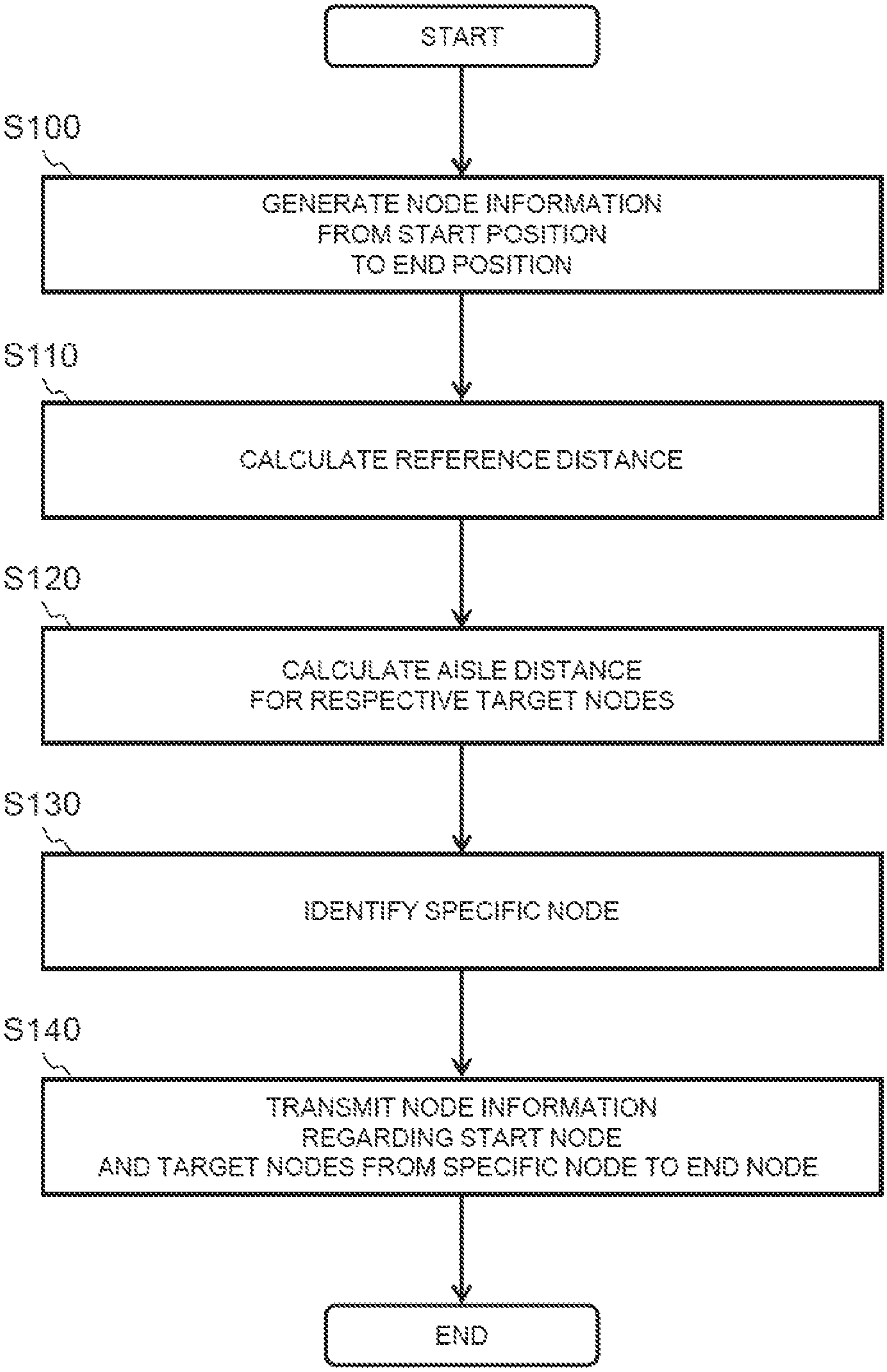
FIG. 7 is a flowchart showing processes executed by the parking assistance apparatus according to the present embodiment.

The following will describe a process executed by the parking assistance apparatus 100 according to the present embodiment, more specifically, a process executed by the processor 120. FIG. 7 is a flowchart showing processes executed by the parking assistance apparatus 100 according to the present embodiment. The flowchart shown in FIG. 7 starts, for example, when the parking assistance apparatus 100 receives a request for leaving the vehicle 12 as the request information.

In step S100, the parking assistance apparatus 100 generates the node information from the start position to the end position of a leaving operation of the vehicle 12.

After step S100, the process proceeds to step S110.

In step S110, the parking assistance apparatus 100 calculates the reference distance between the start node and the reference node.

After step S110, the process proceeds to step S120.

In step S120, the parking assistance apparatus 100 calculates, for respective the target nodes, the aisle distance.

In step S130, the parking assistance apparatus 100 identifies, based on the reference distance calculated in step S110 and the aisle distances calculated in step S120, the specific node whose the aisle distance is most approximate to the reference distance among the target nodes.

After step S130, the process proceeds to step S140.

In step S140, the parking assistance apparatus 100 transmits the node information regarding the start node and regarding the target nodes from the specific node to the end node. After step S140, the process ends.

In this way, the parking assistance apparatus 100 executes the processes. And in this way, a method according to the present embodiment for assisting parking of the vehicle 12 is realized by the parking assistance apparatus 100. Furthermore, the method according to the present embodiment can be realized by the computer program 112 causing the parking assistance apparatus 100 to execute the processes described above.

When the reference node, which is a node located in front of the vehicle 12, is not present in the node information generated in step S100, the parking assistance apparatus 100 may be configured to execute a process of transmitting the generated node information to the vehicle 12 without executing the processes related to step S110 to step S130. Employing such a configuration, when there is a low possibility that the node information includes nodes which are not actually considered in the process of generating the travel trajectory 17. It is thus possible to suppress unnecessary execution of the process. As a result, the processing efficiency can be improved.

In step S120, the number of nodes for which the aisle distance is calculated among the target nodes need only be sufficient to identify the specific node in step S130. Therefore, for example, the parking assistance apparatus 100 can be configured to execute the following processes in step S120.

Figure 8:
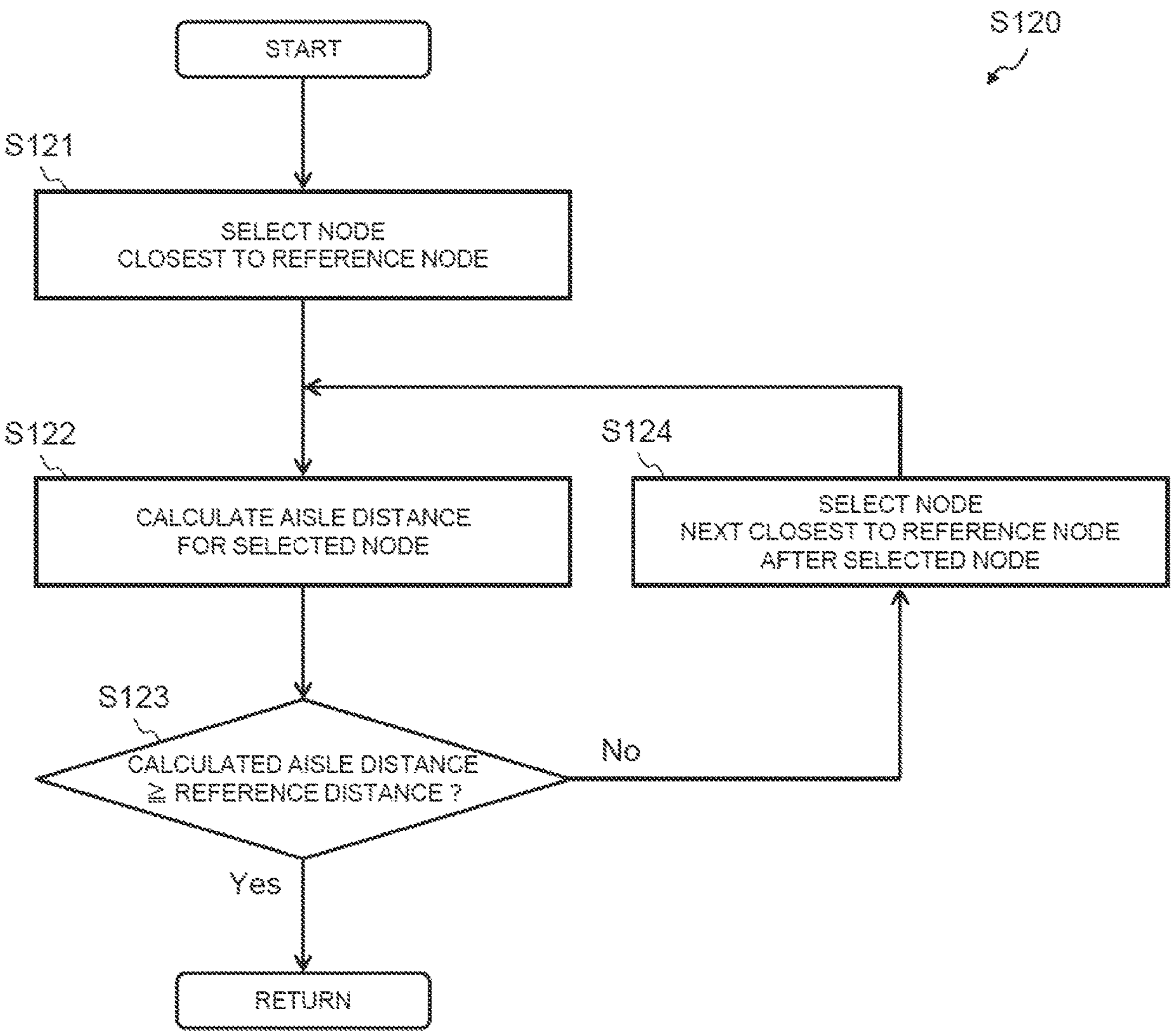
FIG. 8 is a flowchart showing processes executed by the parking assistance apparatus according to the present embodiment in calculation of an aisle distance.

FIG. 8 is a flowchart showing an example of processes executed by the parking assistance apparatus 100 in step S120 shown in FIG. 7. The flowchart shown in FIG. 8 starts when the process related to step S120 is executed in the flowchart shown in FIG. 7.

In step S121, the parking assistance apparatus 100 selects a node closest to the reference node among the target nodes.

After step S121, the process proceeds to step S122.

In step S122, the parking assistance apparatus 100 calculates an aisle distance for the selected node in step S121.

After step S122, the process proceeds to step S123.

In step S123, the parking assistance apparatus 100 determines whether or not the calculated aisle distance in step S122 is greater than or equal to the reference distance.

When the calculated aisle distance in Step S122 is greater than or equal to the reference distance (step S123; Yes), the parking assistance apparatus 100 terminates the calculating the aisle distance. Then, the process proceeds to a process of identifying the specific node (Step S130 shown in FIG. 7).

When the calculated aisle distance in step S122 is smaller than the reference distance (step S123; No), the parking assistance apparatus 100 newly selects a node next closest to the reference node the selected node (step S124). For example, in the case that the node information includes information of the sequence number which numbers each of the plurality of nodes with 1, 2, 3, . . . in order of proximity from the reference node, the parking assistance apparatus 100 may be configured to, in step S124, newly select a node in which the sequence number is incremented.

After step S124, the process returns to step S122 again to repeat the processing.

By the parking assistance apparatus 100 executing the processes as shown in FIG. 8, for respective target node, the aisle distances are calculated in order from a node closest to the reference node. And when the calculated aisle distance is greater than or equal to the reference distance, the process of step S120 (calculating the aisle distance) is terminated. Then, when the calculating the aisle distance is terminated, one of a first node and a second node can be considered to be the specific node, the first node being a node to be the calculated target when the aisle distance is calculated greater than or equal to the reference distance, the second node being a node to be the calculated target just before the calculation for the first node. Therefore, the parking assistance apparatus 100 can be configured to, in step S130, select, as the specific node, one of the first node and the second node whose the aisle distance is closer to the reference distance.

Also, considering that the aisle distance may not become extremely large due to the definition of the aisle distance, it is assumed that the repetitive processes according to the flowchart shown in FIG. 8 will be completed in several steps. As a result, the processing load of the parking assistance apparatus 100 does not excessively increase with respect to the process of identifying the specific node.

4. Effect

As described above, according to the present embodiment, with respect to the node information from the start position to the end position of the leaving operation of the vehicle 12, the specific node whose the aisle distance is most approximate to the reference distance is identified. And, among the node information, the node information regarding the start node and regarding nodes from the specific node to the end node is transmitted to the vehicle 12. It is thus possible to, when the vehicle 12 performs the leaving operation, reduce the possibility that the transmitted node information includes nodes which are actually not considered in the process of generating the travel trajectory 17. Consequently, it is possible to reduce the processing load of the process of generating the travel trajectory 17 when the vehicle 12 performs the leaving operation. Furthermore, it is possible to reduce the cost of the ECU 202. In addition, the amount of data to be transmitted to the vehicle 12 can be reduced.

What is claimed is:

1. A method for assisting parking of a vehicle in a parking lot, the method comprising the steps of:

generating node information from a start position to an end position of a leaving operation of the vehicle when a leaving of the vehicle from the parking lot is started;

generating, based on the node information, a travel trajectory;

calculating a reference distance which is a distance between a start node being a node corresponding to the start position and a reference node being a node located in front of the vehicle among nodes located on a drive aisle of the parking lot;

calculating, for respective target nodes, an aisle distance which is a distance from the reference node to a respective target node, the target nodes being nodes from the reference node to an end node being a node corresponding to the end position;

identifying a specific node which is a node whose aisle distance is most approximate to the reference distance among the target nodes;

transmitting, to the vehicle, the node information regarding the start node and regarding the target nodes from the specific node to the end node; and controlling a vehicle to travel in accordance with the travel trajectory, the travel trajectory reaching a center of the drive aisle with a constant curvature from the start node.

2. The method according to claim 1, wherein the step of calculating the aisle distance includes the steps of:

calculating the aisle distance sequentially for the target nodes in an order closer to the reference node; and terminating the calculating the aisle distance when the calculated aisle distance is greater than or equal to the reference distance.

3. The method according to claim 2, wherein the step of identifying the specific node includes the step of selecting, as the specific node, one of a first node and a second node whose aisle distance is closer to the reference distance, the first node being a node to be a calculated target when the aisle distance is calculated greater than or equal to the reference distance, the second node being a node to be the calculated target just before the calculation for the first node.

4. An apparatus for assisting parking of a vehicle in a parking lot, the apparatus configured to execute:

generating node information from a start position to an end position of a leaving operation of the vehicle when a leaving of the vehicle is started;

generating, based on the node information, a travel trajectory;

calculating a reference distance which is a distance between a start node being a node corresponding to the start position and a reference node being a node located in front of the vehicle among nodes located on a drive aisle of the parking lot;

calculating, for respective target nodes, an aisle distance which is a distance from the reference node to a respective target node, the target nodes being nodes from the reference node to an end node being a node corresponding to the end position;

identifying a specific node which is a node whose aisle distance is most approximate to the reference distance among the target nodes;

transmitting, to the vehicle, the node information regarding the start node and regarding the target nodes from the specific node to the end node; and controlling a vehicle to travel in accordance with the travel trajectory, the travel trajectory reaching a center of the drive aisle with a constant curvature from the start node.

5. A non-transitory computer readable recording medium on which a computer program for assisting parking of a vehicle in a parking lot is recorded, the computer program, when executed by a computer, causing the computer to execute:

generating node information from a start position to an end position of a leaving operation of the vehicle when a leaving of the vehicle is started;

generating, based on the node information, a travel trajectory;

calculating a reference distance which is a distance between a start node being a node corresponding to the start position and a reference node being a node located in front of the vehicle among nodes located on a drive aisle of the parking lot;

calculating, for respective target nodes, an aisle distance which is a distance from the reference node to a respective target node, the target nodes being nodes from the reference node to an end node being a node corresponding to the end position;

identifying a specific node which is a node whose aisle distance is most approximate to the reference distance among the target nodes;

transmitting, to the vehicle, the node information regarding the start node and regarding the target nodes from the specific node to the end node; and controlling a vehicle to travel in accordance with the travel trajectory, the travel trajectory reaching a center of the drive aisle with a constant curvature from the start node.

* * * * *